United States Patent [19]

Hirai

[11] Patent Number: 4,948,826

[45] Date of Patent: Aug. 14, 1990

[54] TRANSPARENT FLAME-RETARDANT SILICONE RUBBER COMPOSITIONS

[75] Inventor: Kazuo Hirai, Ichihara, Japan

[73] Assignee: Toray Silicone Company Limited, Tokyo, Japan

[21] Appl. No.: 329,060

[22] Filed: Mar. 27, 1989

[30] Foreign Application Priority Data

Mar. 29, 1988 [JP] Japan ................................. 63-75766

[51] Int. Cl.$^5$ .............................................. C08K 5/10
[52] U.S. Cl. ..................................... 524/309; 524/306; 524/394; 524/398; 524/403
[58] Field of Search ............... 524/394, 398, 403, 306, 524/309

[56] References Cited

U.S. PATENT DOCUMENTS

| 4,108,825 | 8/1978 | Hayes | 524/403 |
| 4,360,388 | 11/1982 | Nauroth et al. | 106/288 |
| 4,366,278 | 12/1982 | Hamada et al. | 524/233 |

FOREIGN PATENT DOCUMENTS 58253 4/1980 Japan.

*Primary Examiner*—Melvyn I. Marquis
*Attorney, Agent, or Firm*—Robert Spector

[57] ABSTRACT

The reaction product of a cerium compound with an alkali metal silanolate in combination with a platinum compound and a titanium compound when added to a peroxide-curable silicone rubber composition yields a transparent, heat stable and flame resistant cured silicone rubber.

3 Claims, No Drawings

TRANSPARENT FLAME-RETARDANT SILICONE RUBBER COMPOSITIONS

BACKGROUND OF THE INVENTION

1. Field of the Invention

The present invention relates to a flame-retardant silicone rubber composition. More particularly, this invention relates to a flame-retardant silicone rubber composition that is transparent.

2. Description of the Prior Art

A number of methods are already known for rendering silicone rubbers flame retardant. One approach comprises the compounding or admixture into a curable silicone rubber composition of a platinum compound and at least one additional flame retarding agent such as titanium oxide, zinc carbonate, manganese carbonate, cerium hydroxide, iron oxide and carbon black.

The use of a cerium-modified silica filler to impart heat stability and flame retardancy to peroxide-cured silicone rubber is taught in P. Nauroth et al. U.S. Pat. No. 4,360,388, on Nov. 23, 1982.

Organosiloxane compositions containing a cerium salt of a fatty acid having from 6 to 12 carbon atoms and that cure by a platinum-catalyzed hydrosilation reaction to yield a heat resistant and flame retardant silicone rubber are described in Japanese Patent Publication No. 58253, published on Apr. 30, 1980.

The presence of prior art flame-retarding agents and typical reinforcing fillers renders a cured silicone rubber organosiloxane composition containing these ingredients opaque.

Transparent silicone rubber can be obtained by curing addition reaction-curable silicone rubber compositions prepared from at least one vinyl group-containing organopolysiloxane, at least one organohydrogenpolysiloxane, and a platinum compound as catalyst. While these compositions exhibit some flame retardancy, their flame-retardant performance nevertheless is relatively low.

The present inventors carried out extensive research directed to solving the foregoing problems, and discovered as a result that, through the admixture of specific compounds, the intrinsic transparency of silicone rubbers can be retained while their flame retardancy can at the same time be substantially improved. The present invention is based on the results of these efforts.

SUMMARY OF THE INVENTION

The present invention is based on the discovery that the reaction product of a cerium compound with an alkali metal silanolate in combination with a platinum compound and a titanium compound yields a transparent, heat stable and flame resistant silicone rubber.

DETAILED DESCRIPTION OF THE INVENTION

The present invention relates to an improved composition for preparing a flame-retardant silicone rubber, said composition comprising (A) 100 weight parts organopolysiloxane having the average unit formula $$R_aSiO_{(4-a)/2}$$

where each R represents a substituted or unsubstituted monovalent hydrocarbon group the value of a is from 1.90 to 2.05, (B) from 1 to 200 parts of platinum or a platinum compound per million parts of said organopolysiloxane, (C) 0.1 to 10 weight parts of an organoperoxide, (D) from 0 to 150 weight parts of a microparticulate silica, and (E) from 0.05 to 2 parts by weight of an organotitanium compound; and (F) a cerium compound in an amount sufficient to impart flame retardancy to said composition.

The improvement comprises the presence as said cerium compound of from 0.05 to 5 parts by weight of the reaction product of a cerium compound with an alkali metal silanolate and the presence as said organotitanium compound of a compound selected from the group consisting of titanate esters and organotitanium chelates.

The novel ingredients that make possible the preparation of a transparent, flame retardant silicone rubber include a reaction product of a cerium compound and an alkali metal silanolate, referred to hereinafter as ingredient (E), and an organotitanium compound, referred to hereinafter as ingredient (F).

The organopolysiloxane comprising identified in the preceding section of this specification a ingredient (A) encompasses those organopolysiloxanes known for use as the main starting materials for silicone rubbers. In the foregoing formula, each R is individually selected from substituted or unsubstituted monovalent hydrocarbon radicals including but not limited to alkyl radicals such as methyl, ethyl and propyl; alkenyl radicals such as vinyl and allyl; aryl radicals groups such as phenyl; cycloalkyl radicals such as cyclopentyl and cyclohexyl; aralkyl radicals such as benzyl; and radicals in which the carbon-bonded hydrogen has been partially or completely replaced by halogen atoms, a cyano group, or a mercapto group. Substituted radicals include but are not limited to chloromethyl, 3,3,3-trifluoropropyl, cyanomethyl and mercaptomethyl.

As a general matter, this organopolysiloxane should have a viscosity of at least 1,000 centistokes ($10^{-3}$ $m^2$/sec) at 25° C., and gums are preferred. Non-limiting examples of such organopolysiloxanes include: dimethylvinylsiloxy- terminated dimethylpolysiloxanes, dimethylvinylsiloxy-terminated dimethylsiloxane-methylvinylsiloxane copolymers, trimethylsiloxy-terminated dimethylsiloxane-methylvinylsiloxane copolymers, dimethylhydroxysiloxy-terminated dimethylsiloxane-methylvinylsiloxane copolymers, and dimethylvinylsiloxy-terminated dimethylsiloxane-methylvinylsiloxane-methylphenylsiloxane copolymers.

The platinum or platinum compound comprising ingredient B of the present compositions imparts some flame retardancy to the cured silicone rubber, but requires the presence of ingredients E and F to provide a useful level of flame retardancy. Platinum and platinum compounds that can serve as ingredient B include but are not limited to platinum black, chloroplatinic acid, olefin complexes of chloroplatinic acid, and complexes between chloroplatinic acid and at least one polymethylvinylsiloxane. The concentration of ingredient B is generally equivalent to from 1 to 200 ppm of platinum metal for each 100 weight parts of ingredient A.

The reaction product of a cerium compound and an alkali metal silanolate that constitutes ingredient E of the present curable compositions imparts a substantial increase in flame retardancy to the cured silicone rubber when used in combination with the titanium compound, ingredient F, and in particular through its joint use with ingredients B and F. The siloxanes that constitute ingredient E contain at least one repeating unit in which the cerium atom is bonded to the oxygen atom of a siloxane unit.

Examples of suitable cerium atom-containing siloxanes include the reaction product obtained from the cerium salt of an organic carboxylic acid and an alkali metal silanolate, as described in Japanese Patent Publication Number 51-24377 [24,377/76]; the reaction product of cerium chloride and an alkali metal silanolate, as described in Japanese Patent Publication Number 53-980 [980/78]; and the composition obtained by the addition of a titanium alkoxy compound or the titanium salt of a carboxylic acid salt to the reaction product of a cerium salt of an organic carboxylic acid and an alkali metal silanolate, as described in Japanese Patent Publication Number 53-12541 [12,541/78]. The alkali metal silanolates are typically prepared by polymerizing one or more cyclic diorganosiloxane oligomers in the presence of an alkali metal hydroxide such as potassium hydroxide.

The concentration of ingredient E in the present compositions should be within the range of from 0.05 to 5 weight parts and preferably within the range of 0.1 to 3 weight parts. The flame retardancy is unsatisfactory at a concentration below 0.05weight parts. On the other hand, no further improvement in flame retardancy is observed above 5 weight parts, which is thus uneconomical.

The organotitanium compound comprising ingredient F of the present compositions substantially improves the flame retardancy of the cured silicone rubber by its use in combination with ingredients B and E. Examples of such organotitanium compounds include but are not limited to titanate esters such as tetrabutyl titanate, tetraisopropyl titanate, tetra(octylene glycol) titanate, and organotitanium chelates such as titanium bis(acetylacetonate), dibutoxytitanium bis(acetylacetonate), and titanium lactate.

The concentration of ingredient F should be within the range of 0.05 to 2 weight parts and preferably within the range of 0.1 to 1 weight part. The flame retardancy will be unsatisfactory at below 0.05 weight parts, while the presence of more than 2 weight parts will reduce the processability of the composition on a roll mill.

The organoperoxide, referred to as ingredient C of the present compositions, operates as the curing catalyst. Non-limiting examples of useful peroxides include benzoyl peroxide, dicumyl peroxide, di-tert-butyl perbenzoate, and 2,5-dimethyl-2,5-di-tert-butylperoxyhexane. The concentration of peroxide should be within the range of from 0.1 to 10 weight parts.

The microparticulate silica, referred to as ingredient D, is optional. Its presence will be determined by the need to improve the mechanical properties of the cured flame-retardant silicone rubber. Examples of this microparticulate silica include but are not limited to fumed silica, precipitated silica, and hydrophobic precipitated silica. The specific surface area of the silica should be at least 200 $m^2/g$ to avoid a reduction in the transparency of the cured silicone rubber.

The composition of the present invention is readily obtained by kneading all of the ingredients using production methods known for processing curable silicone rubber compositions. The composition is cured by heating it to a temperature sufficiently high to decompose the organic peroxide. Any of the fabrication methods applicable to conventional silicone rubbers can be used, including, for example, press molding, extrusion molding, coating molding and injection molding.

Because silicone rubber compositions of this invention can be thermally cured to produce transparent and flame-retardant silicone rubber moldings, they are ideal for use in the production of silicone rubber tubing, silicone rubber hosing, as a sealant for coating or connecting electronic and electrical devices and automotive parts, and as a coating material for discharge plates or glass slides.

EXAMPLES

The following examples are intended to describe preferred embodiments of the present invention and should not be interpreted as limiting the scope of the invention as defined in the accompanying claims. Unless otherwise specified all parts and percentages specified in the examples are by weight and viscosities were measured at 25 degrees C.

EXAMPLE 1

Preparation of a Reaction Product of a Cerium Compound and an Alkali Metal Silanolate 0.3 parts hexamethylphosphoramide and 33 parts potassium silanolate (prepared by reacting potassium hydroxide, hexamethylcyclotrisiloxane, and octamethylcyclotetrasiloxane) were added to 67 parts of a trimethylsiloxy-terminated dimethylpolysiloxane having a viscosity of 20 cS ($2 \times 10^{-5}$ $m^2$/sec) at 25 degrees Centigrade. The resultant mixture was reacted by heating it for 1 hour at 115° C. under a nitrogen flow. 120 Parts dry xylene and 16 parts cerium 2-ethylhexoate were then added, followed by heating of the reaction mixture at the boiling point for 2.5 hours.

After cooling to room temperature, the reaction mixture was neutralized by the addition of 3 parts trimethylchlorosilane. The solvent was then evaporated under reduced pressure and the resulting solid removed by filtration to yield a light yellow liquid reaction product. This reaction product was principally composed of a polyorganosiloxane containing 1.2 weight % of cerium.

The following ingredients were blended into 100 parts dimethylvinylsiloxy-terminated dimethylsiloxanemethylvinyl-siloxane gum having a viscosity of 20,000,000 cS and a vinyl content of 0.1 mole %
  50 parts fumed silica having a specific surface area of 300 $m^2$/g,
  2 parts hydroxyl-terminated dimethylpolysiloxane (viscosity=40 cS) as plasticizer, and
  7 parts diphenylsilanediol.

The ingredients were blended for 3 hours in a kneader heated to 175 degrees Centigrade.

To the resultant mixture was then added a quantity of a 3 weight % isopropanolic chloroplatinic acid solution equivalent to 10 ppm platinum metal based on the weight of total composition, followed by the addition of 0.2 part of the cerium-containing organopolysiloxane described in the preceding portion of this example, 0.2 part of tetrabutyl titanate, and 1 part of a paste consisting essentially of a 50 weight % dispersion of 2,4-dichlorobenzoyl peroxide in a dimethylpolysiloxane oil.

The resultant curable transparent, flame retardant organosiloxane composition of this invention was press-cured for 5 minutes at 130° C. to yield a molded sheet with a thickness of 1.6 mm. The transparency and flame retardancy of this sheet were measured, and the obtained results are reported in Table 1.

Flame retardancy was measured according to the self-extinguishing test method of Underwriter's Laboratory (UL) test method no. 94.

For comparison, silicone rubber compositions were prepared as described in the preceding section of this example, but omitting the cerium-containing organopolysiloxane and/or the tetrabutyl titanate. These compositions were similarly tested, and these results are also reported in Table 1.

TABLE 1

| Ingredients and Test Results | present invention | comparative examples | | |
|---|---|---|---|---|
| organopolysiloxane (parts) gum | 100 | 100 | 100 | 100 |
| silica (parts) | 50 | 50 | 50 | 50 |
| platinum (ppm) | 10 | 10 | 10 | 10 |
| cerium-containing (parts) organopolysiloxane | 0.2 | 0 | 0.4 | 0 |
| tetrabutyl titanate (parts) | 0.2 | 0 | 0 | 0.4 |
| 2,4-dichlorobenzoyl (parts) peroxide paste | 1 | 1 | 1 | 1 |
| transparency (tr = transparent) | tr | tr | tr | tr |
| self-extinguishing time (sec) (time until extinction) | 18 | completely burned | 35 | 38 |

That which is claimed is:

1. In a transparent flame-retardant silicone rubber composition comprising (A) 100 parts by weight of an organopolysiloxane having the average unit formula $$R_aSiO_{(4-a)/2}$$

where each R represents a substituted or unsubstituted monovalent hydrocarbon radical and the value of a is from 1.90 to 2.05;

(B) from 1 to 200 parts by weight of platinum or a platinum compound per million parts of said organopolysiloxane;

(C) from 0.1 to 10 parts by weight of an organoperoxide;

(D) from 0 to 150 parts by weight of a microparticulate silica;

(E) from 0.05 to 2 parts by weight of an organotitanium compound; and (F) a cerium compound in an amount sufficient to impart flame retardancy to said composition, the improvement comprising the presence as said cerium compound of from 0.05 to 5 parts by weight of the reaction product of a cerium compound with an alkali metal silanolate and the presence as said organotitanium compound of a compound selected from the group consisting of titanate esters and organotitanium chelates.

2. A composition according to claim 1 where said alkali metal silanolate is prepared by the polymerization of a cyclic diorganosiloxane oligomer in the presence of potassium hydroxide, the concentration of said reaction product is from 0.1 to 3 weight parts, the concentration of said organotitanium compound is from 0.1 to 1 weight part, R is selected from the group consisting of methyl, ethyl, propyl, vinyl, allyl, phenyl, cyclopentyl, cyclohexyl, benzyl, chloromethyl, 3,3,3-trifluoropropyl, cyanomethyl and mercaptomethyl, and said plantinum compound is selected from the group consisting of chloroplatinic acid, olefin complexes of chloroplatinic acid, and complexes of chloroplatinic acid and a polymethylvinylsiloxane.

3. A composition according to claim 2 where said cyclic diorganosiloxane oligomer is a cyclic dimethylsiloxane oligomer and said organotitanium compound is selected from the group consisting of tetrabutyl titanate, tetraisopropyl titanate, tetra(octylene glycol) titantate, titanium bis(acetylacetonate), dibutoxytitanium bis(acetylacetonate), and titanium lactate.

* * * * *